May 27, 1952 — T. J. DENNING — 2,598,514
DITCHER
Filed April 15, 1948
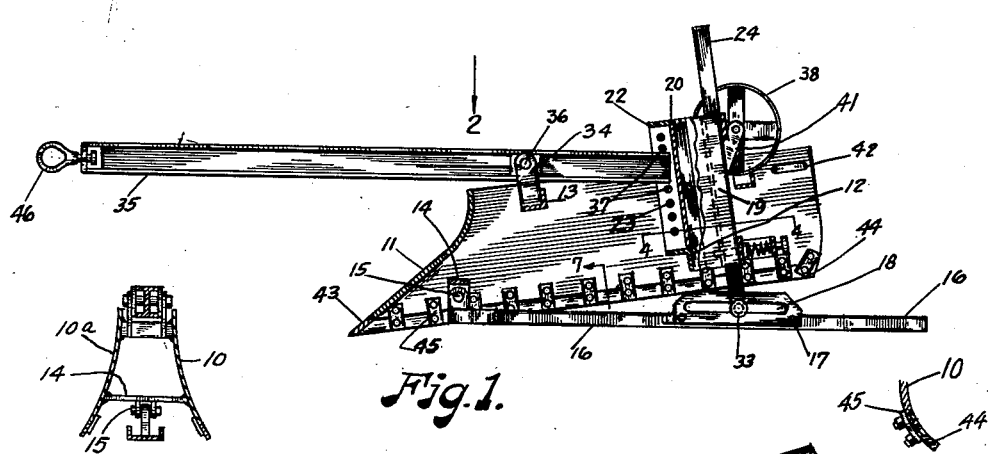
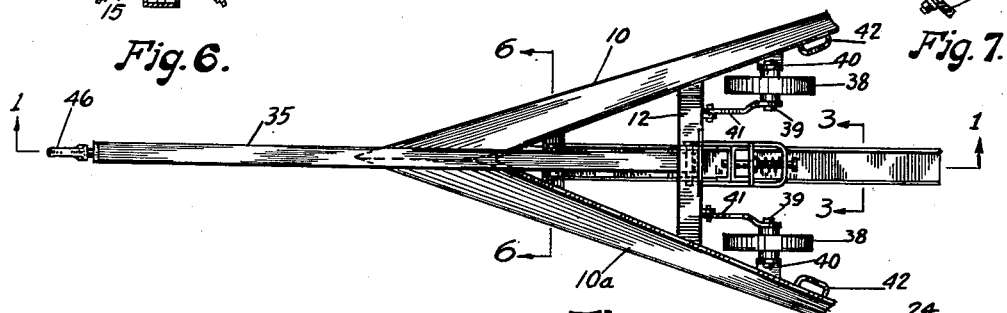
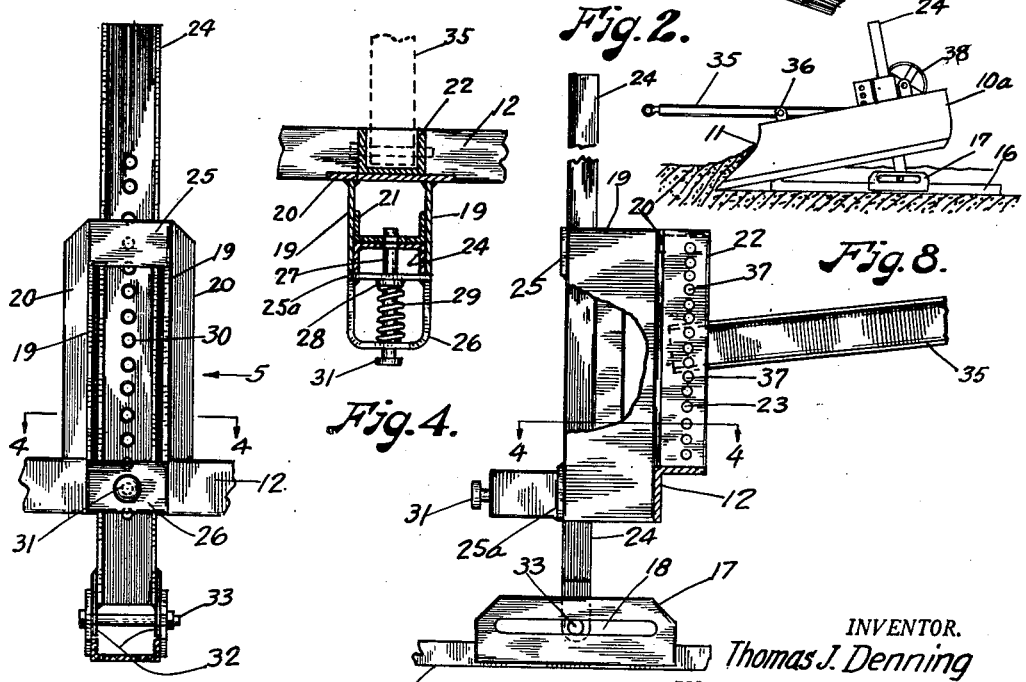
INVENTOR.
Thomas J. Denning
BY Martin E. Anderson
ATTORNEY Patented May 27, 1952

2,598,514

UNITED STATES PATENT OFFICE 2,598,514

DITCHER

Thomas J. Denning, Hudson, Colo.

Application April 15, 1948, Serial No. 21,202

5 Claims. (Cl. 37—98)

This invention relates to improvements in ditchers of the type employed for making and cleaning irrigation ditches.

In those parts of our country where irrigation is practiced, water is conducted to the fields in ditches of sizes varying from large laterals that commence at the canals to the small ditches in the fields.

Irrigation laterals and ditches are, as a rule, formed by ditching machines, especially designed for this purpose, which may be horse or tractor drawn.

During the summer and fall of the year, weeds and grass make a heavy growth along the sides of the laterals and along the small ditches which must be cleaned out every spring. Sediment also settles in the laterals and ditches; this reduces their depth and makes it necessary to remove such sediment each year.

It is the object of this invention to produce a ditcher of the A type of an improved construction that will facilitate its use and increase its adaptability.

It is the principal object of this invention to provide a simple and substantial mechanism for adjusting the ditcher so as to produce the depth and width of ditches desired.

A further object of this invention is to produce a ditcher of such construction and design that it can be readily transported from place to place and which, for this purpose, is provided with wheels on which it is supported during such transportation.

The above and any other objects that may become apparent as this description proceeds is attained by means of a construction and an arrangement of parts that will now be described in detail, and for this purpose reference will be had to the accompanying drawing in which the invention has been illustrated, and in which:

Figure 1 is a longitudinal section taken on line 1—1, in Figure 2;

Figure 2 is a top plan view looking downwardly in the direction of arrow 2, in Figure 1;

Figure 3 is a rear elevation of the adjusting mechanism looking towards the right in Figure 5;

Figure 4 is a section taken on lines 4—4, in Figures 1, 3 and 5;

Figure 5 is a side elevation of the adjusting mechanism looking in the direction of arrow 5, in Figure 3;

Figure 6 is a section taken on line 6—6, in Figure 2;

Figure 7 is a section taken on line 7, in Figure 1; and

Figure 8 is a side elevation to a somewhat smaller scale showing the position of the ditcher during operation.

The ditcher to which this invention relates comprises an assembly resembling an A-type snowplow and is provided with two blades or mold boards which have been designated by reference numerals 10 and 10a in the drawing. These are connected at their front ends so as to form a sharp edge which has been identified by reference numeral 11. Such connection is usually effected by welding. At a point slightly more than half the distance from the point to the rear of the mold boards, is positioned a spacer angle 12, whose ends are welded or otherwise secured to the inner surfaces of the mold board. Another spacer angle 13 is secured to the mold boards near the top and near the front ends, as indicated in Figure 1. Another spacer bar 14 is also provided near the bottom of the mold boards and this is provided with downwardly extending lugs 15 to which the front end of the runner 16 is pivotally connected. Runner 16 has been shown as formed from a channel whose flanges extend upwardly. Secured to the outside of this channel by welding or otherwise, are two plates 17, each of which is provided with a long slot 18. Secured to the spacer angle 12 by means of welding, are two parallel rearwardly and upwardly extending plates 19. A plate 20 is welded to the front edges of plates 19 and forms with the latter a rearwardly opening channel. A channel 21 is positioned between plates 19 and secured thereto by welding or any other suitable means. Secured to the front side of plate 20 is a channel 22, whose forwardly extending flanges are provided with a number of holes 23 for a purpose which will hereinafter appear. The rear surface of channel 21 is positioned forwardly of the rear edges of plates 19, forming a space for a channel 24 that is slidably mounted in this space. A cross bar 25 is welded to the rear edges of plates 19, near their upper ends and a similar cross bar 25a is welded to the rear edges of plates 19, near their lower ends. Plates 25 and 25a serve to hold channel 24 in position. Secured to the rear of plate 25a is a U-shaped strap 26. The base of strap 26 and the plate 25a are provided with holes through which a latching pin 27 extends. This pin is provided with a collar 28 that forms an abutment for spring 29. The latching bolt, when in the position shown in Figure 4, extends through one of the openings 30 in bar 24 and through an opening in channel 21 and therefore serves to hold bar 24 in adjusted position. By exerting a pull on head 31, the latching pin may be removed from bar 24 and the latter adjusted for a purpose which will hereinafter appear.

The lower end of bar 24 projects downwardly between plates 17 and has been shown as provided with downwardly extending plates 32 that are perforated for the reception of a bolt 33 that extends through slots 18. It will therefore be seen that the runner 16 is secured to the lower end of bar 24 and since the latter is fastened to the mold boards, the angular relation between the plane of the cutting edges of the mold boards and the runner may be angularly adjusted to any position desired. One such angular position has been shown in Figure 8. Extending upwardly from spacer 13 are two plates 34, between which the tongue 35 is positioned and to which it is pivotally connected by means of a pin 36. The rear end of the tongue projects into the spacer between the flanges of channel 22 and is held in position therein by means of two bolts or pins passed through openings 37. By means of the two adjustments shown and described above, the angular relation of the mold boards to the runner 16 may be changed so as to obtain the depth and inclination of the ditch that is to be made or cleaned. When the angular relation between the mold boards and the runner 16 is changed, it is also necessary to change the angular relation of the tongue to the mold boards so as to get the proper draft action.

It will be observed from the drawing that the ditcher is provided with two wheels 38 that are pivoted on axles 39 held in place by brackets 40 and straps 41, the latter being connected to the spacer bar 12, as shown most clearly in Figure 2. The inner surfaces of the mold boards are provided with handles 42 for convenience in lifting the mold boards during the time they are angularly adjusted with respect to the runner 16. The mold boards are provided with a removable point 43 and removable cutting blades 44 that are held in place by means of fish plates 45 or any other suitable means. By having a removable point and removable cutting plates 44, these parts may be sharpened whenever desired and replaced when worn. The front end of the tongue is provided with a ring 46 that has a swivel connection with the tongue and serves as a means for effecting connection with a tractor.

Referring now more particularly to Figure 5, it will be observed that since plates 19 and the parts associated therewith are rigidly connected with the spacer angle 12, it is necessary to provide a slot 18 for effecting a connection with the lower end of bar 24, because the position of pin 33 will, of course, change longitudinally with respect to the runner bar whenever the angle is changed or adjusted.

From the above description, taken in connection with the drawing, it will be apparent that the machine which has been illustrated and described above is of a substantial construction and that it can be readily adjusted for the purpose of changing the depth or angular relation of the ditches which are to be made or cleaned. The construction of the adjusting means has been illustrated in detail in Figures 3, 4 and 5 and forms the gist of this invention and it is to this feature of the machine that the claims will be directed in particular.

Although a specific construction has been shown and described as being suitable for the purpose under consideration, it is evident that minor changes may be made without departing from the invention and defined in the appended claims.

Having described the invention what is claimed as new is:

1. A ditcher of the A type having two angularly related blades, a ground engaging runner, means adjustably connecting the runner and blades for varying the vertical angle therebetween including; guide means disposed between the blades and fixed relative thereto, an upwardly ranging bar slidable relative to the guide means and selectively securable thereto in various positions of adjustment, means connecting the lower end of the bar to the runner bar; a tongue pivotally connected to the blades, and means for adjusting the vertical angle between the tongue and the blades, the last named means comprising; a channel disposed parallel to said guide means for receiving the rear end of the tongue, and means for securing the rear end of said tongue to the channel in various positions of adjustment.

2. A ditcher in accordance with claim 1 wherein the last named securing means comprises a plurality of horizontal apertures in said channel, and a pair of pins extending therethrough, one above and the other below the rear end of said tongue.

3. In a ditcher of the A type having two angularly related blades, a ground engaging runner, means for adjustably connecting the runner and blades for varying the vertical angle therebetween, a tongue pivotally connected to the blades, means for adjusting the vertical angle between the tongue and the blades, the last two named means including a unitary member disposed between the blades fixed relative thereto, said member having guide means engageable with a runner supporting bar constructed and arranged to restrain the bar to rectilinear movement, the member including tongue engaging means for securing the rear end of the tongue thereto in various positions of pivotal adjustment of the tongue relative to the blades.

4. Apparatus in accordance with claim 3 wherein said guide means and tongue engaging means comprise elongated substantially parallel channels.

5. Apparatus in accordance with claim 3 wherein the tongue engaging means includes a channel in which the rearmost portion of the tongue may swing when the latter is adjusted, and means for securing said end to the channel in all positions of adjustment therein.

THOMAS J. DENNING.

REFERENCES CITED

The following references are of record in the file of this patent:

UNITED STATES PATENTS

| Number | Name | Date |
|---|---|---|
| 113,722 | Baker | Apr. 18, 1871 |
| 1,280,518 | Meyer | Oct. 1, 1918 |
| 1,311,829 | Martin | July 29, 1919 |
| 1,665,428 | Wagner | Apr. 10, 1928 |